(12) United States Patent
Langhammer (10) Patent No.: US 8,645,451 B2
(45) Date of Patent: Feb. 4, 2014

(54) DOUBLE-CLOCKED SPECIALIZED PROCESSING BLOCK IN AN INTEGRATED CIRCUIT DEVICE

(75) Inventor: Martin Langhammer, Alderbury (GB)

(73) Assignee: Altera Corporation, San Jose, CA (US)

(*) Notice: Subject to any disclaimer, the term of this patent is extended or adjusted under 35 U.S.C. 154(b) by 483 days.

(21) Appl. No.: 13/044,680

(22) Filed: Mar. 10, 2011

(65) Prior Publication Data

US 2012/0233230 A1  Sep. 13, 2012

(51) Int. Cl.
*G06F 7/523* (2006.01)

(52) U.S. Cl.
USPC .......................................................... 708/620

(58) Field of Classification Search
None
See application file for complete search history.

(56) References Cited

U.S. PATENT DOCUMENTS

| | | | |
|---|---|---|---|
| 3,473,160 A | 10/1969 | Wahlstrom |
| 3,800,130 A | 3/1974 | Martinson et al. |
| 3,814,924 A | 6/1974 | Tate |
| 4,156,927 A | 5/1979 | McElroy et al. |
| 4,179,746 A | 12/1979 | Tubbs |
| 4,212,076 A | 7/1980 | Conners |
| 4,215,406 A | 7/1980 | Gomola et al. |
| 4,215,407 A | 7/1980 | Gomola et al. |
| 4,422,155 A | 12/1983 | Amir et al. |
| 4,484,259 A | 11/1984 | Palmer et al. |
| 4,521,907 A | 6/1985 | Amir et al. |
| 4,575,812 A | 3/1986 | Kloker et al. |
| 4,597,053 A | 6/1986 | Chamberlin |
| 4,616,330 A | 10/1986 | Betz |
| 4,623,961 A | 11/1986 | Mackiewicz |
| 4,682,302 A | 7/1987 | Williams |
| 4,718,057 A | 1/1988 | Venkitakrishnan et al. |
| 4,727,508 A | 2/1988 | Williams |
| 4,736,335 A | 4/1988 | Barkan |
| 4,754,421 A | 6/1988 | Bosshart |
| 4,791,590 A | 12/1988 | Ku et al. |

(Continued)

FOREIGN PATENT DOCUMENTS

| | | |
|---|---|---|
| EP | 0 158 430 | 10/1985 |
| EP | 0 326 415 | 8/1989 |

(Continued)

OTHER PUBLICATIONS

Altera Corporation, "Advanced Synthesis Cookbook: A Design Guide for Stratix II, Stratix III and Stratix IV Devices," Document Version 3.0, 112 pgs., May 2008.

(Continued)

*Primary Examiner* — David H Malzahn
(74) *Attorney, Agent, or Firm* — Ropes & Gray LLP; Jeffrey H. Ingerman (57) ABSTRACT

Circuitry for increasing the precision of multipliers by a desired factor while limiting the increase in arithmetic complexity of the multiplier to that factor can be provided in a fixed logic device, or can be configured into a programmable integrated circuit device such as a programmable logic device (PLD). The smaller increase in arithmetic complexity, so that the increase is proportional to the increase in precision, rather than to the square of the increase in precision, is achieved by using specialized processing block components differently on alternating clock cycles. For example, to implement double precision, the same multiplier components are used in each of two clock cycles, but some specialized processing block internal structures (e.g., shifters and adders) are used differently in the two cycles, so that over the two cycles, a larger multiplication may be calculated from smaller partial products.

33 Claims, 6 Drawing Sheets

(56) References Cited

U.S. PATENT DOCUMENTS

| | | | |
|---|---|---|---|
| 4,799,004 A | 1/1989 | Mori |
| 4,823,295 A | 4/1989 | Mader |
| 4,839,847 A | 6/1989 | Laprade |
| 4,871,930 A | 10/1989 | Wong et al. |
| 4,912,345 A | 3/1990 | Steele et al. |
| 4,918,637 A | 4/1990 | Morton |
| 4,967,160 A | 10/1990 | Quievy et al. |
| 4,982,354 A | 1/1991 | Takeuchi et al. |
| 4,991,010 A | 2/1991 | Hailey et al. |
| 4,994,997 A | 2/1991 | Martin et al. |
| 5,068,813 A | 11/1991 | Thoen |
| 5,073,863 A | 12/1991 | Zhang |
| 5,081,604 A | 1/1992 | Tanaka |
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,339,263 A | 8/1994 | White |
| 5,349,250 A | 9/1994 | New |
| 5,357,152 A | 10/1994 | Jennings, III et al. |
| 5,371,422 A | 12/1994 | Patel et al. |
| 5,375,079 A | 12/1994 | Uramoto et al. |
| 5,381,357 A | 1/1995 | Wedgwood et al. |
| 5,404,324 A | 4/1995 | Colon-Benet |
| 5,416,799 A | 5/1995 | Currivan et al. |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,812 A | 3/1996 | Saishi et al. |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,541,864 A | 7/1996 | Van Bavel et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,623,377 A | 4/1997 | Behrens et al. |
| 5,631,848 A | 5/1997 | Laczko et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,519 A | 7/1997 | Yatim et al. |
| 5,644,522 A | 7/1997 | Moyse et al. |
| 5,646,545 A | 7/1997 | Trimberger et al. |
| 5,646,875 A | 7/1997 | Taborn et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,771,186 A | 6/1998 | Kodali et al. |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,808,926 A | 9/1998 | Gorshtein et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,847,978 A | 12/1998 | Ogura et al. |
| 5,847,981 A | 12/1998 | Kelley et al. |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,935,197 A * | 8/1999 | Aldworth ..................... 708/200 |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,018,755 A | 1/2000 | Gonikberg et al. |
| 6,020,759 A | 2/2000 | Heile |
| 6,021,423 A | 2/2000 | Nag et al. |
| 6,029,187 A | 2/2000 | Verbauwhede |
| 6,031,763 A | 2/2000 | Sansbury |
| 6,041,339 A | 3/2000 | Yu et al. |
| 6,041,340 A | 3/2000 | Mintzer |
| 6,052,327 A | 4/2000 | Reddy et al. |
| 6,052,755 A | 4/2000 | Terrill et al. |
| 6,055,555 A | 4/2000 | Boswell et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |
| 6,075,381 A | 6/2000 | LaBerge |

(56) References Cited

U.S. PATENT DOCUMENTS

| | | |
|---|---|---|
| 6,084,429 A | 7/2000 | Trimberger |
| 6,085,317 A | 7/2000 | Smith |
| 6,091,261 A | 7/2000 | De Lange |
| 6,091,765 A | 7/2000 | Pietzold, III et al. |
| 6,094,726 A | 7/2000 | Gonion et al. |
| 6,097,988 A | 8/2000 | Tobias |
| 6,098,163 A | 8/2000 | Guttag et al. |
| 6,107,820 A | 8/2000 | Jefferson et al. |
| 6,107,821 A | 8/2000 | Kelem et al. |
| 6,107,824 A | 8/2000 | Reddy et al. |
| 6,130,554 A | 10/2000 | Kolze et al. |
| 6,140,839 A | 10/2000 | Kaviani et al. |
| 6,144,980 A | 11/2000 | Oberman |
| 6,154,049 A | 11/2000 | New |
| 6,157,210 A | 12/2000 | Zaveri et al. |
| 6,163,788 A | 12/2000 | Chen et al. |
| 6,167,415 A | 12/2000 | Fischer et al. |
| 6,175,849 B1 | 1/2001 | Smith |
| 6,215,326 B1 | 4/2001 | Jefferson et al. |
| 6,226,735 B1 | 5/2001 | Mirsky |
| 6,242,947 B1 | 6/2001 | Trimberger |
| 6,243,729 B1 | 6/2001 | Staszewski |
| 6,246,258 B1 | 6/2001 | Lesea |
| 6,260,053 B1 | 7/2001 | Maulik et al. |
| 6,279,021 B1 | 8/2001 | Takano et al. |
| 6,286,024 B1 | 9/2001 | Yano et al. |
| 6,314,442 B1 | 11/2001 | Suzuki |
| 6,314,551 B1 | 11/2001 | Borland |
| 6,321,246 B1 | 11/2001 | Page et al. |
| 6,323,680 B1 | 11/2001 | Pedersen et al. |
| 6,327,605 B2 | 12/2001 | Arakawa et al. |
| 6,351,142 B1 | 2/2002 | Abbott |
| 6,353,843 B1 | 3/2002 | Chehrazi et al. |
| 6,359,468 B1 | 3/2002 | Park et al. |
| 6,360,240 B1 | 3/2002 | Takano et al. |
| 6,362,650 B1 | 3/2002 | New et al. |
| 6,366,944 B1 | 4/2002 | Hossain et al. |
| 6,367,003 B1 | 4/2002 | Davis |
| 6,369,610 B1 | 4/2002 | Cheung et al. |
| 6,377,970 B1 | 4/2002 | Abdallah et al. |
| 6,407,576 B1 | 6/2002 | Ngai et al. |
| 6,407,694 B1 | 6/2002 | Cox et al. |
| 6,427,157 B1 | 7/2002 | Webb |
| 6,434,587 B1 | 8/2002 | Liao et al. |
| 6,438,569 B1 | 8/2002 | Abbott |
| 6,438,570 B1 | 8/2002 | Miller |
| 6,446,107 B1 | 9/2002 | Knowles |
| 6,453,382 B1 | 9/2002 | Heile |
| 6,467,017 B1 | 10/2002 | Ngai et al. |
| 6,480,980 B2 | 11/2002 | Koe |
| 6,483,343 B1 | 11/2002 | Faith et al. |
| 6,487,575 B1 | 11/2002 | Oberman |
| 6,523,055 B1 | 2/2003 | Yu et al. |
| 6,523,057 B1 | 2/2003 | Savo et al. |
| 6,531,888 B2 | 3/2003 | Abbott |
| 6,538,470 B1 | 3/2003 | Langhammer et al. |
| 6,542,000 B1 | 4/2003 | Black et al. |
| 6,556,044 B2 | 4/2003 | Langhammer et al. |
| 6,557,092 B1 | 4/2003 | Callen |
| 6,571,268 B1 | 5/2003 | Giacalone et al. |
| 6,573,749 B2 | 6/2003 | New et al. |
| 6,574,762 B1 | 6/2003 | Karimi et al. |
| 6,591,283 B1 | 7/2003 | Conway et al. |
| 6,591,357 B2 | 7/2003 | Mirsky |
| 6,600,495 B1 | 7/2003 | Boland et al. |
| 6,600,788 B1 | 7/2003 | Dick et al. |
| 6,628,140 B2 | 9/2003 | Langhammer et al. |
| 6,687,722 B1 | 2/2004 | Larsson et al. |
| 6,692,534 B1 | 2/2004 | Wang et al. |
| 6,700,581 B2 | 3/2004 | Baldwin et al. |
| 6,725,441 B1 | 4/2004 | Keller et al. |
| 6,728,901 B1 | 4/2004 | Rajski et al. |
| 6,731,133 B1 | 5/2004 | Feng et al. |
| 6,732,134 B1 | 5/2004 | Rosenberg |
| 6,744,278 B1 | 6/2004 | Liu et al. |
| 6,745,254 B2 | 6/2004 | Boggs et al. |
| 6,763,367 B2 | 7/2004 | Kwon et al. |
| 6,771,094 B1 | 8/2004 | Langhammer et al. |
| 6,774,669 B1 | 8/2004 | Liu et al. |
| 6,781,408 B1 | 8/2004 | Langhammer |
| 6,781,410 B2 | 8/2004 | Pani et al. |
| 6,788,104 B2 | 9/2004 | Singh et al. |
| 6,801,924 B1 | 10/2004 | Green et al. |
| 6,806,733 B1 | 10/2004 | Pan et al. |
| 6,836,839 B2 | 12/2004 | Master et al. |
| 6,874,079 B2 | 3/2005 | Hogenauer |
| 6,889,238 B2 | 5/2005 | Johnson |
| 6,904,471 B2 | 6/2005 | Boggs et al. |
| 6,915,322 B2 * | 7/2005 | Hong ............... 708/625 |
| 6,917,955 B1 | 7/2005 | Botchev |
| 6,924,663 B2 | 8/2005 | Masui et al. |
| 6,959,316 B2 * | 10/2005 | Parviainen ............ 708/620 |
| 6,963,890 B2 | 11/2005 | Dutta et al. |
| 6,971,083 B1 | 11/2005 | Farrugia et al. |
| 6,978,287 B1 | 12/2005 | Langhammer |
| 6,983,300 B2 | 1/2006 | Ferroussat |
| 7,020,673 B2 | 3/2006 | Ozawa |
| 7,047,272 B2 | 5/2006 | Giacalone et al. |
| 7,062,526 B1 | 6/2006 | Hoyle |
| 7,093,204 B2 | 8/2006 | Oktem et al. |
| 7,107,305 B2 | 9/2006 | Deng et al. |
| 7,113,969 B1 | 9/2006 | Green et al. |
| 7,181,484 B2 | 2/2007 | Stribaek et al. |
| 7,313,585 B2 | 12/2007 | Winterrowd |
| 7,395,298 B2 | 7/2008 | Debes et al. |
| 7,401,109 B2 | 7/2008 | Koc et al. |
| 7,409,417 B2 | 8/2008 | Lou |
| 7,415,542 B2 | 8/2008 | Hennedy et al. |
| 7,421,465 B1 | 9/2008 | Rarick et al. |
| 7,428,565 B2 | 9/2008 | Fujimori |
| 7,428,566 B2 | 9/2008 | Siu et al. |
| 7,430,578 B2 | 9/2008 | Debes et al. |
| 7,430,656 B2 | 9/2008 | Sperber et al. |
| 7,447,310 B2 | 11/2008 | Koc et al. |
| 7,472,155 B2 | 12/2008 | Simkins et al. |
| 7,508,936 B2 | 3/2009 | Eberle et al. |
| 7,519,646 B2 * | 4/2009 | Kaul et al. ............ 708/620 |
| 7,536,430 B2 | 5/2009 | Guevokian et al. |
| 7,567,997 B2 | 7/2009 | Simkins et al. |
| 7,587,443 B1 * | 9/2009 | Langhammer ............ 708/625 |
| 7,590,676 B1 | 9/2009 | Langhammer |
| 7,646,430 B2 | 1/2010 | Brown Elliott et al. |
| 7,668,896 B2 | 2/2010 | Lutz et al. |
| 7,719,446 B2 | 5/2010 | Rosenthal et al. |
| 7,769,797 B2 | 8/2010 | Cho et al. |
| 7,814,137 B1 | 10/2010 | Mauer |
| 7,822,799 B1 | 10/2010 | Langhammer et al. |
| 7,836,117 B1 | 11/2010 | Langhammer et al. |
| 7,865,541 B1 | 1/2011 | Langhammer |
| 7,930,335 B2 | 4/2011 | Gura |
| 7,930,336 B2 | 4/2011 | Langhammer |
| 2001/0023425 A1 | 9/2001 | Oberman et al. |
| 2001/0029515 A1 | 10/2001 | Mirsky |
| 2001/0037351 A1 | 11/2001 | Hellberg |
| 2001/0037352 A1 * | 11/2001 | Hong ............... 708/625 |
| 2002/0002573 A1 | 1/2002 | Landers et al. |
| 2002/0038324 A1 | 3/2002 | Page et al. |
| 2002/0049798 A1 | 4/2002 | Wang et al. |
| 2002/0078114 A1 | 6/2002 | Wang et al. |
| 2002/0089348 A1 | 7/2002 | Langhammer |
| 2002/0116434 A1 | 8/2002 | Nancekievill |
| 2003/0088757 A1 | 5/2003 | Lindner et al. |
| 2004/0064770 A1 | 4/2004 | Xin |
| 2004/0078403 A1 | 4/2004 | Scheuermann et al. |
| 2004/0083412 A1 | 4/2004 | Corbin et al. |
| 2004/0103133 A1 | 5/2004 | Gurney |
| 2004/0122882 A1 | 6/2004 | Zakharov et al. |
| 2004/0148321 A1 | 7/2004 | Guevorkian et al. |
| 2004/0172439 A1 | 9/2004 | Lin |
| 2004/0178818 A1 | 9/2004 | Crotty et al. |
| 2004/0193981 A1 | 9/2004 | Clark et al. |
| 2004/0267857 A1 | 12/2004 | Abel et al. |
| 2004/0267863 A1 | 12/2004 | Bhushan et al. |
| 2005/0038842 A1 | 2/2005 | Stoye |

(56) References Cited

U.S. PATENT DOCUMENTS

| | | | |
|---|---|---|---|
| 2005/0144212 | A1 | 6/2005 | Simkins et al. |
| 2005/0144215 | A1 | 6/2005 | Simkins et al. |
| 2005/0144216 | A1 | 6/2005 | Simkins et al. |
| 2005/0166038 | A1 | 7/2005 | Wang et al. |
| 2005/0187997 | A1 | 8/2005 | Zheng et al. |
| 2005/0187999 | A1 | 8/2005 | Zheng et al. |
| 2005/0262175 | A1 | 11/2005 | Iino et al. |
| 2006/0020655 | A1 | 1/2006 | Lin |
| 2007/0083585 | A1 | 4/2007 | St Denis et al. |
| 2007/0185951 | A1 | 8/2007 | Lee et al. |
| 2007/0185952 | A1 | 8/2007 | Langhammer et al. |
| 2007/0241773 | A1 | 10/2007 | Hutchings et al. |
| 2008/0133627 | A1 | 6/2008 | Langhammer et al. |
| 2008/0183783 | A1 | 7/2008 | Tubbs |
| 2009/0172052 | A1 | 7/2009 | DeLaquil et al. |
| 2009/0187615 | A1 | 7/2009 | Abe et al. |
| 2009/0300088 | A1 | 12/2009 | Michaels et al. |
| 2010/0098189 | A1 | 4/2010 | Oketani |

FOREIGN PATENT DOCUMENTS

| | | |
|---|---|---|
| EP | 0 380 456 | 8/1990 |
| EP | 0 411 491 | 2/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 049 025 | 11/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-068709 | 3/1992 |
| JP | 4-332036 | 11/1992 |
| JP | 5-134851 | 6/1993 |
| JP | 06-187129 | 7/1994 |
| JP | 7-135447 | 5/1995 |
| JP | 9-327000 | 12/1997 |
| JP | 11-296345 | 10/1999 |
| JP | 2000-259394 | 9/2000 |
| JP | 2002-108606 | 4/2002 |
| JP | 2002-251281 | 9/2002 |
| WO | WO95-27243 | 10/1995 |
| WO | WO96-28774 | 9/1996 |
| WO | WO97-08606 | 3/1997 |
| WO | WO98-12629 | 3/1998 |
| WO | WO98-32071 | 7/1998 |
| WO | WO98-38741 | 9/1998 |
| WO | WO99-22292 | 5/1999 |
| WO | WO99-31574 | 6/1999 |
| WO | WO99-56394 | 11/1999 |
| WO | WO00-51239 | 8/2000 |
| WO | WO00-52824 | 9/2000 |
| WO | WO01-13562 | 2/2001 |
| WO | WO 2005/066832 | 7/2005 |
| WO | WO2005-101190 | 10/2005 |
| WO | WO 2010/102007 | 9/2010 |

OTHER PUBLICATIONS deDinechin, F. et al., "Large multipliers with less DSP blocks," retrieved from http://hal-ens-lyon.archives-ouvertes.fr/ensl-00356421/en/, 9 pgs., available online Jan. 2009.

Wajih, E.-H.Y. et al., "Efficient Hardware Architecture of Recursive Karatsuba-Ofman Multiplier," $3^{rd}$ *International Conference on Design and Technology of Integrated Systems in Nanoscale Era*, 6 pgs, Mar. 2008.

Zhou, G. et al., "Efficient and High-Throughput Implementations of AES-GCM on FPGAs," *International Conference on Field-Programmable Technology*, 8 pgs., Dec. 2007.

Farooqui, A., et al., "General Data-Path Organization of a MAC unit for VLSI Implementation of DSP Processors," ISCAS '98, Part 2, May 31, 1998-Jun. 3, 1998, pp. 260-263.

Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.

Altera Corporation, "Statix II Device Handbook, Chapter 6—DSP Blocks in Stratix II Devices," v1.1, Jul. 2004.

Altera Corporation, "Digital Signal Processing (DSP)," *Stratix Device Handbook*, vol. 2, Chapter 6 and Chapter 7, v1.1 (Sep. 2004).

Altera Corporation, "DSP Blocks in Stratix II and Stratix II GX Devices," *Stratix II Device Handbook*, vol. 2, Chapter 6, v4.0 (Oct. 2005).

Altera Corporation, "FIR Compiler: MegaCore® Function User Guide," version 3.3.0, rev. 1, pp. 3 11 through 3 15 (Oct. 2005).

Amos, D., "PLD architectures match DSP algorithms," *Electronic Product Design*, vol. 17, No. 7, Jul. 1996, pp. 30, 32.

Analog Devices, Inc., The Applications Engineering Staff of Analog Devices, DSP Division, *Digital Signal Processing Applications Using the ADSP-2100 Family* (edited by Amy Mar), 1990, pp. 141-192).

Andrejas, J., et al., "Reusable DSP functions in FPGAs," *Field-Programmable Logic and Applications. Roadmap to Reconfigurable Computing. 10th International Conference, FPL 2000. Proceedings (Lecture Notes in Computer Science* vol. 1896), Aug. 27-30, 2000, pp. 456-461.

Aoki, T., "Signed-weight arithmetic and its application to a field-programmable digital filter architecture," *IEICE Transactions on Electronics*, 1999, vol. E82C, No. 9, Sep. 1999, pp. 1687-1698.

Ashour, M.A., et al., "An FPGA implementation guide for some different types of serial-parallel multiplier-structures," *Microelectronics Journal*, vol. 31, No. 3, 2000, pp. 161-168.

Berg, B.L., et al."Designing Power and Area Efficient Multistage FIR Decimators with Economical Low Order Filters," *ChipCenter Technical Note*, Dec. 2001.

Bursky, D., "Programmable Logic Challenges Traditional ASIC SoC Designs", *Electronic Design*, Apr. 15, 2002.

Chhabra, A. et al., Texas Instruments Inc., "A Block Floating Point Implementation on the TMS320C54x DSP", Application Report SPRA610, Dec. 1999, pp. 1-10.

Colet, p., "When DSPs and FPGAs meet: Optimizing image processing architectures," *Advanced Imaging*, vol. 12, No. 9, Sep. 1997, pp. 14, 16, 18.

Crookes, D., et al., "Design and implementation of a high level programming environment for FPGA-based image processing," *IEE Proceedings-Vision, Image and Signal Processing*, vol. 147, No. 4, Aug. 2000, pp. 377-384.

Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.

Dick, C., et al., "Configurable logic for digital communications: some signal processing perspectives," *IEEE Communications Magazine*, vol. 37, No. 8, Aug. 1999, pp. 107-111.

Do, T.-T., et al., "A flexible implementation of high-performance FIR filters on Xilinx FPGAs," *Field-Programmable Logic and Applications: From FPGAs to Computing Paradigm. 8th International Workshop, FPL'98. Proceedings*, Hartenstein, R.W., et al., eds., Aug. 31-Sep. 3, 1998, pp. 441-445.

Gaffer, A.A., et al., "Floating-Point Bitwidth Analysis via Automatic Differentiation," *IEEE Conference on Field Programmable Technology*, Hong Kong, Dec. 2002.

(56) References Cited

OTHER PUBLICATIONS

Guccione, S.A.,"Run-time Reconfiguration at Xilinx," *Parallel and distributed processing: 15 IPDPS 2000 workshops*, Rolim, J., ed., May 1-5, 2000, p. 873.
Hauck, S., "The Future of Reconfigurable Systems," *Keynote Address, 5th Canadian Conference on Field Programmable Devices*, Jun. 1998, http:--www.ee.washington.edu-people-faculty-hauck-publications-ReconfigFuture.PDF.
Haynes, S.D., et al., "Configurable multiplier blocks for embedding in FPGAs," *Electronicas Letters*, vol. 34, No. 7, pp. 638-639 (Apr. 2, 1998).
Heysters, P.M., et al., "Mapping of DSP algorithms on field programmable function arrays," *Field-Programmable Logic and Applications. Roadmap to Reconfigurable Computing. 10th International Conference, FPL 2000. Proceedings (Lecture Notes in Computer Science* vol. 1896), Aug. 27-30, 2000, pp. 400-411.
Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.
Lattice Semiconductor Corp, *ORCA® FPGA Express™ Interface Manual: ispLEVER® Version 3.0*, 2002.
Lucent Technologies, Microelectronics Group,"Implementing and Optimizing Multipliers in ORCA™ FPGAs,", Application Note. AP97-008FGPA, Feb. 1997.
"Implementing Multipliers in Flex 10K EABs", *Altera*, Mar. 1996.
"Implementing Logic with the Embedded Array in FLEX 10K Devices", *Altera*, May 2001, ver. 2.1.
Jinghua Li, "Design a pocket multi-bit multiplier in FPGA," *1996 2nd International Conference on ASIC Proceedings (IEEE* Cat. No. 96TH8140), Oct. 21-24, 1996, pp. 275-279.
Jones, G., "Field-programmable digital signal conditioning," *Electronic Product Design*, vol. 21, No. 6, Jun. 2000, pp. C36-C38.
Kiefer, R., et al., "Performance comparison of software-FPGA hardware partitions for a DSP application," *14th Australian Microelectronics Conference. Microelectronics: Technology Today for the Future. MICRO '97 Proceedings*, Sep. 28-Oct. 1, 1997, pp. 88-93.
Kramberger, I., "DSP acceleration using a reconfigurable FPGA," *ISIE '99. Proceedings of the IEEE International Symposium on Industrial Electronics* (Cat. No. 99TH8465), vol. 3 , Jul. 12-16, 1999, pp. 1522-1525.
Langhammer, M., "How to implement DSP in programmable logic," *Elettronica Oggi*, No. 266 , Dec. 1998, pp. 113-115.
Langhammer, M., "Implementing a DSP in Programmable Logic," *Online EE Times*, May 1998, http:--www.eetimes.com-editorial-1998-coverstory9805.html.
Lazaravich, B.V., "Function block oriented field programmable logic arrays," *Motorola, Inc. Technical Developments*, vol. 18, Mar. 1993, pp. 10-11.
Lund, D., et al., "A new development system for reconfigurable digital signal processing," First International Conference on 3G Mobile Communication Technologies (Conf. Publ. No. 471), Mar. 27-29, 2000, pp. 306-310.
Miller, N.L., et al., "Reconfigurable integrated circuit for high performance computer arithmetic," *Proceedings of the 1998 IEE Colloquium on Evolvable Hardware Systems (Digest)*, No. 233, 1998, pp. 2-1-2-4.
Mintzer, L., "Xilinx FPGA as an FFT processor," *Electronic Engineering*, vol. 69, No. 845, May 1997, pp. 81, 82, 84.
Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.
Nozal, L., et al., "A new vision system: programmable logic devices and digital signal processor architecture (PLD+DSP)," *Proceedings IECON '91. 1991 International Conference on Industrial Electronics, Control and Instrumentation* (Cat. No. 91CH2976-9), vol. 3, Oct. 28-Nov. 1, 1991, pp. 2014-2018.
Papenfuss, J.R, et al., "Implementation of a real-time, frequency selective, RF channel simulator using a hybrid DSP-FPGA architecture," *RAWCON 2000: 2000 IEEE Radio and Wireless Conference* (Cat. No. 00EX404), Sep. 10-13, 2000, pp. 135-138.
Parhami, B., "Configurable arithmetic arrays with data-driven control," *34th Asilomar Conference on Signals, Systems and Computers*, vol. 1, 2000, pp. 89-93.
"The QuickDSP Design Guide", Quicklogic, Aug. 2001, revision B.
"QuickDSP™ Family Data Sheet", *Quicklogic*, Aug. 7, 2001, revision B.
Rangasayee, K., "Complex PLDs let you produce efficient arithmetic designs," *EDN (European Edition)*, vol. 41, No. 13, Jun. 20, 1996, pp. 109, 110, 112, 114, 116.
Rosado, A., et al., "A high-speed multiplier coprocessor unit based on FPGA," *Journal of Electrical Engineering*, vol. 48, No. 11-12, 1997, pp. 298-302.
Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications* (Cat. No. 99EX303), Jul. 26-28, 1999, pp. 147-150.
Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.
Tisserand, A., et al., "An on-line arithmetic based FPGA for low power custom computing," *Field Programmable Logic and Applications, 9th International Workshop, FPL '99, Proceedings (Lecture Notes in Computer Science* vol. 1673), Lysaght, P., et al., eds., Aug. 30-Sep. 1, 1999, pp. 264-273.
Tralka, C., "Symbiosis of DSP and PLD," *Elektronik*, vol. 49, No. 14 , Jul. 11, 2000, pp. 84-96.
Underwood, K. "FPGAs vs. CPUs: Trends in Peak Floating-Point Performance," *Proceedings of the 2004 ACM-SIGDA 12th International Symposium on Field Programmable Gate Arrays*, pp. 171-180, Feb. 22-24, 2004.
Valls, J., et al., "A Study About FPGA-Based Digital Filters," *Signal Processing Systems*, 1998, SIPS 98, 1998 IEEE Workshop, Oct. 10, 1998, pp. 192-201.
"Virtex-II 1.5V Field-Programmable Gate Arrays", *Xilinx*, Jan. 25, 2001, module 2 of 4.
"Virtex-II 1.5V Field-Programmable Gate Arrays", *Xilinx*, Apr. 2, 2001, module 1 of 4.
"Virtex-II 1.5V Field-Programmable Gate Arrays", *Xilinx*, Apr. 2, 2001, module 2 of 4.
Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.
Weisstein, E.W., "Karatsuba Multiplication," *MathWorld—A Wolfram Web Resource* (Dec. 9, 2007), accessed Dec. 11, 2007 at http:--mathworld.wolfram.com-KaratsubaMultiplication.html.
Wenzel, L., "Field programmable gate arrays (FPGAs) to replace digital signal processor integrated circuits," *Elektronik* , vol. 49, No. 5, Mar. 7, 2000, pp. 78-86.
"Xilinx Unveils New FPGA Architecture to Enable High-Performance, 10 Million System Gate Designs", *Xilinx*, Jun. 22, 2000.
"Xilinx Announces DSP Algorithms, Tools and Features for Virtex-II Architecture", *Xilinx*, Nov. 21, 2000.
Xilinx Inc., "Virtex-II 1.5V Field-Programmable Gate Arrays", Advance Product Specification, DS031-2 (v1.9), Nov. 29, 2001, Module 2 of 4, pp. 1-39.
Xilinx Inc., "Using Embedded Multipliers", Virtex-II Platform FPGA Handbook, UG002 (v1.3), Dec. 3, 2001, pp. 251-257.
Xilinx, Inc., "A 1D Systolic FIR," copyright 1994-2002, downloaded from http:--www.iro.umontreal.ca-~aboulham-F6221-Xilinx%20A%201D%20systolic%20FIR.htm.
Xilinx, Inc., "The Future of FPGA's," White Paper, available Nov. 14, 2005 for download from http:--www.xilinx.com-prs_rls,5yrwhite.htm.
Xilinx Inc., "XtremeDSP Design Considerations User Guide," v 1.2, Feb. 4, 2005.
Xilinx Inc., "Complex Multiplier v2.0", DS291 Product Specification/Datasheet, Nov. 2004.

(56) References Cited

OTHER PUBLICATIONS

Martinson, L. et al., "Digital Matched Filtering with Pipelined Floating Point Fast Fourier Transforms (FFT's)," *IEEE Transactions on Acoustics, Speech, and Signal Processing*, vol. ASSP-23, No. 2, pp. 222-234, Apr. 1975.

Govindu, G. et al., "A Library of Parameterizable Floating-Point Cores for FPGAs and Their Application to Scientific Computing," *Proc Int'l Conf. Eng. Reconfigurable Systems and Algorithms (ERSA '05)*, Jun. 2005.

Govindu, G. et al., "Analysis of High-performance Floating-point Arithmetic on FPGAs," *Proceedings of the 18th International Parallel and Distributed Processing Symposium (PDPS'04)*, pp. 149-156, Apr. 2004.

Nakasato, N., et al., "Acceleration of Hydrosynamical Simulations using a FPGA board" *The Institute of Electronics Information and Communication Technical Report CPSY2005-47*, vol. 105, No. 515, Jan. 17, 2006.

Osana, Y., et al., "Hardware-resource Utilization Analysis on an FPGA-Based Biochemical Simulator ReCSiP", *The Institute of Electronics Information and Communication Technical Report CPSY2005-63*, vol. 105, No. 516, Jan. 18, 2006.

Vladimirova, T. et al., "Floating-Point Mathematical Co-Processor for a Single-Chip On-Board Computer," *MAPLD'03 Conference*, D5, Sep. 2003.

\* cited by examiner

DOUBLE-CLOCKED SPECIALIZED PROCESSING BLOCK IN AN INTEGRATED CIRCUIT DEVICE

FIELD OF THE INVENTION

This invention relates to a specialized processing block in an integrated circuit device, and particularly in programmable integrated circuit devices such as programmable logic devices (PLDs). More particularly, this invention relates to using different parts of the specialized processing block on different clock cycles.

BACKGROUND OF THE INVENTION

Considering a programmable logic device (PLD) as one example of an integrated circuit device, as applications for which PLDs are used increase in complexity, it has become more common to design PLDs to include specialized processing blocks in addition to blocks of generic programmable logic resources. Such specialized processing blocks may include a concentration of circuitry on a PLD that has been partly or fully hardwired to perform one or more specific tasks, such as a logical or a mathematical operation. A specialized processing block may also contain one or more specialized structures, such as an array of configurable memory elements. Examples of structures that are commonly implemented in such specialized processing blocks include: multipliers, arithmetic logic units (ALUs), barrel-shifters, various memory elements (such as FIFO/LIFO/SIPO/RAM/ROM/CAM blocks and register files), AND/NAND/OR/NOR arrays, etc., or combinations thereof.

One particularly useful type of specialized processing block that has been provided on PLDs is a digital signal processing (DSP) block, which may be used to process, e.g., audio signals. Such blocks are frequently also referred to as multiply-accumulate ("MAC") blocks, because they include structures to perform multiplication operations, and sums and/or accumulations of multiplication operations.

For example, PLDs sold by Altera Corporation, of San Jose, Calif., as part of the STRATIX® family include DSP blocks, each of which includes a plurality of multipliers. Each of those DSP blocks also includes adders and registers, as well as programmable connectors (e.g., multiplexers) that allow the various components of the block to be configured in different ways. In each such block, the multipliers can be configured not only as individual multipliers, but also as one larger multiplier.

As the precision of a multiplier increases, its interface requirements (i.e., the number of inputs) increase proportionally to the increase in precision, but its arithmetic complexity (i.e., the number of gates in the multiplier) increases proportionally to the square of the increase in precision. For example, if the precision of a multiplier, as implemented in one of the aforementioned STRATIX® PLDs, is increased from single precision to double precision (i.e., by a factor of two), its interface requirements also increase by a factor of two (from 18 bits to 36 bits), but its arithmetic complexity increases by a factor of about four.

SUMMARY OF THE INVENTION

The present invention relates to circuitry for increasing the precision of multipliers by a desired factor while limiting the increase in arithmetic complexity of the multiplier to that factor. The circuitry can be provided in a fixed logic device, or can be configured into a programmable integrated circuit device such as a programmable logic device (PLD).

The smaller increase in arithmetic complexity, so that the increase is proportional to the increase in precision, rather than to the square of the increase in precision, is achieved by using specialized processing block components differently on alternating clock cycles. For example, to implement double precision, the same multiplier components are used in each of two clock cycles, but some specialized processing block internal structures (e.g., shifters and adders) are used differently in the two cycles, so that over the two cycles, a larger multiplication may be calculated from smaller partial products. In this description and the claims which follow, such a process may be referred to as "double clocking," notwithstanding any other definition of "double clocking" that may exist in any other context. Moreover, it may be possible to break the inputs into three (or more) groups and process each one on every third (or more) clock cycles. Thus, the process may be more generally described as "multi-clocking," notwithstanding any other definition of "multi-clocking" that may exist in any other context.

Therefore, in accordance with the present invention, there is provided a block of circuitry, within an integrated circuit device clocked by a device clock signal. The block of circuitry is clocked by a block clock signal and includes block inputs for accepting data input from outside the block of circuitry on which arithmetic operations are to be performed, arithmetic operations circuitry having arithmetic inputs connected to the block inputs for performing arithmetic operations on the data, and logical operations circuitry operating on outputs of the arithmetic operations circuitry. The arithmetic operations circuitry operates substantially identically on substantially all clock pulses of the block clock signal, and the logic operations circuitry operates in a first mode on a first set of clock pulses of the block clock signal, and operates in a second mode on a second set of clock pulses of the block clock signal interleaved with the first set of clock pulses.

A method of configuring such circuitry on a programmable device, and a machine-readable data storage medium encoded with software for performing the method, are also provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

The present invention may be used to configure double-clocked circuitry for multiplication with reduced arithmetic complexity as compared to circuitry that is not double-clocked as described herein. Although a number of different embodiments will be described below for purposes of illustration, the invention is not limited to those embodiments.

Figure 1:
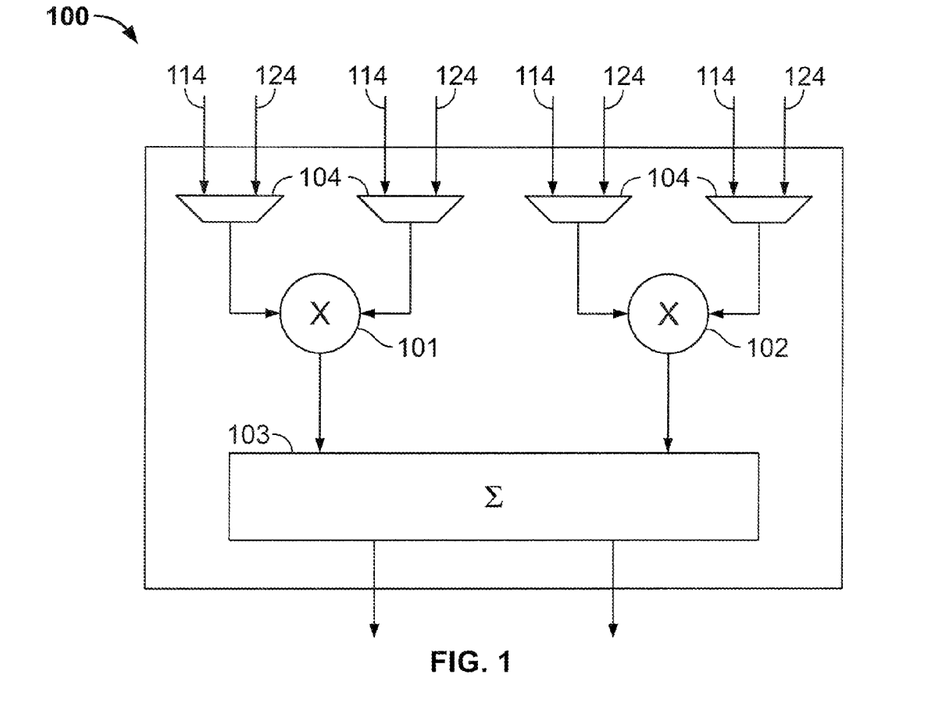
FIG. 1 shows a specialized processing block with which embodiments of the present invention may be used.

FIG. 1 shows a specialized processing block 100 which is similar to a DSP block of a programmable logic device from the aforementioned STRATIX® family sold by Altera Corporation. Specialized processing block 100 includes two 18×18 multipliers 101, 102, as well as processing circuitry 103 which may include registers, compressors, carry-propagate adders, shifters and at least one accumulator. Specialized processing block 100 further includes input multiplexers 104, to enable 18×18 multipliers 101, 102 to function as 27×27 multipliers. Specialized processing block 100 may be clocked at twice the clock speed of the integrated circuit device in which it is included, or it may run on the same clock but operate on both rising and falling edges of the clock. If a separate clock is provided, it may be provided by a phase-locked loop (PLL), a delay-locked loop (DLL), or some other clock doubling circuit. Moreover, any such separate clock may be provided at a multiple greater than two, as discussed above. And whatever the multiple, the ability to operate at a multiple of the device clock may be provided on a block-by-clock basis. On a first clock cycle, inputs 114 will be selected by multiplexers 104, while on a second clock cycle, alternating with the first clock cycle, inputs 124 will be selected by multiplexers 104.

Thus, one significant difference between specialized processing block 100 and a known specialized processing block such as that in one of the aforementioned STRATIX® devices is the provision of input multiplexers 104 upstream of multipliers 101, 102, and additional inputs to feed those multiplexers 104. Specifically, while a block having two 18×18 multipliers may need 72 inputs (36 inputs per multiplier), two 27×27 multipliers would need 108 inputs (54 inputs per multiplier). Thus, in specialized processing block 100, multipliers 101, 102 and circuitry 103 downstream of multipliers 101, 102 operate similarly on each clock cycle, except on the alternating clock cycles occurring upstream of multipliers 101, 102 in input multiplexers 104. The effectively larger multiplier may or may not need additional outputs as compared to a known specialized processing block such as that in one of the aforementioned STRATIX® devices, because the number of outputs is dictated more by the number of significant bits that are called for by the particular application.

Figure 2:
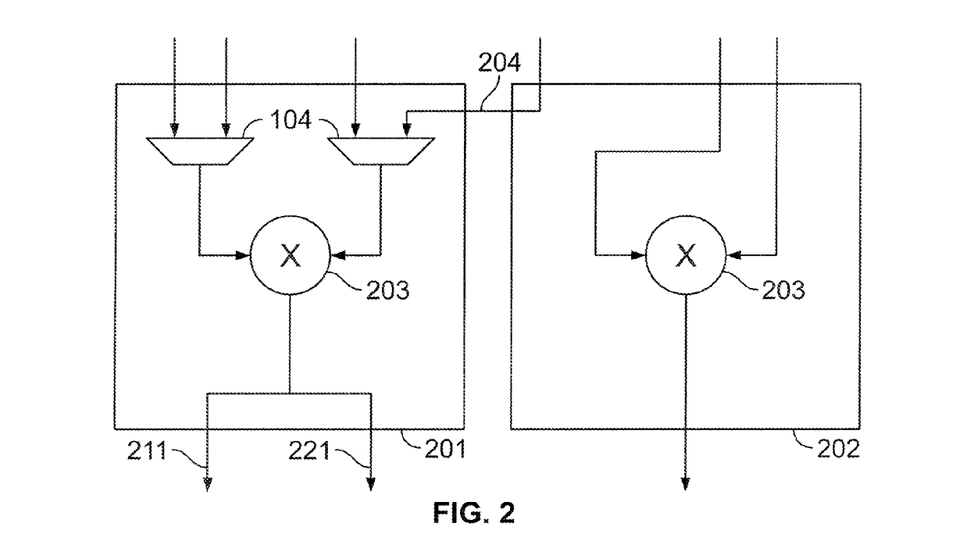
FIG. 2 schematically shows two specialized processing blocks configured according to an embodiment of the invention.

FIG. 2 shows another arrangement including two blocks 201, 202, each having at least one 27×27 multiplier 203 and downstream circuitry 103 (not shown), with at least 81 inputs per block. Block 201 also includes input multiplexers 104. A connection 204 between blocks 201, 202 allows block 201 to borrow 27 inputs from block 202. By double clocking block 201 and using the borrowed inputs, the 27×27 multiplier 203 of block 201 can be operated as two 27×27 multipliers (with 81+27=108 inputs, as needed for two 27×27 multipliers) with respective output 211, 221, so that double-clocked block 201 together with single-clocked block 202 which donates some of its inputs, together function as three 27×27 multipliers.

Figure 3:
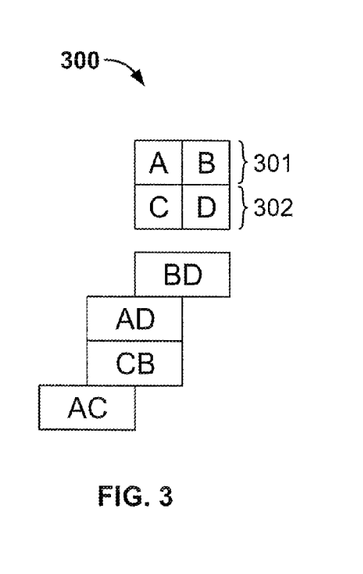
FIG. 3 represents the decomposition of a 36×36 multiplication operation.
Figure 4:
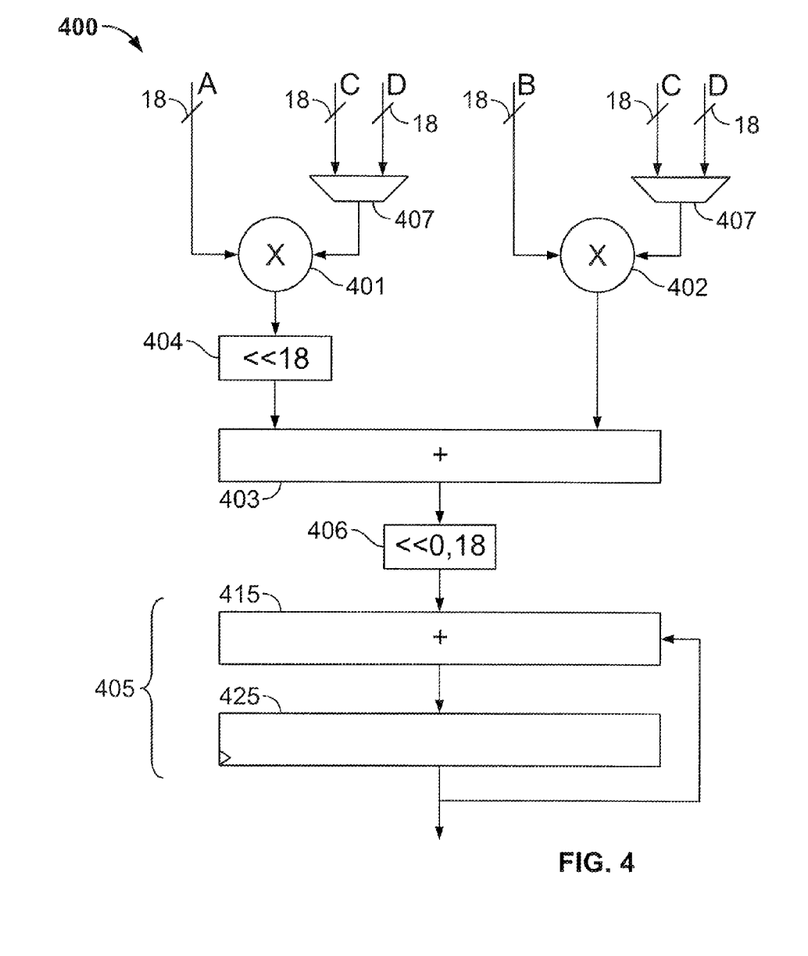
FIG. 4 shows two specialized processing blocks configured according to a first embodiment of the invention to perform the multiplication operation of FIG. 3.

FIG. 3 shows the breakdown 300 of a 36×36 single-precision multiplication operation, in which a first multiplicand 301 may be represented as an 18-bit MSB segment A concatenated with an 18-bit LSB segment B, and a second multiplicand 302 may be represented as an 18-bit MSB segment C concatenated with an 18-bit LSB segment D. FIG. 4 shows a specialized processing block 400 that may be double-clocked in accordance with an embodiment of the present invention to implement multiplication operation 300.

Specialized processing block 400 includes two 18×18 multipliers 401, 402 whose outputs are input to an adder 403 (which in turn may be made up of compressors and a carry-propagate adder, not shown). An 18-bit left-shifter 404 is located between multiplier 401 and adder 403. The outputs of adder 403 are accumulated in accumulator 405, which in turn is made up of adder 415 and register 425. A left-shifter 406, located between adder 403 and accumulator 405, shifts left 18 bits on the first of each two alternating cycles, but does not operate (or shifts zero bits) on the second of each two alternating cycles. In addition, input multiplexers 407 are provided on one input of each of multipliers 401, 402.

On the first of each two alternating cycles, both multiplexers 407 select their respective D-input. BD is then computed by multiplier 402, while right-shifted AD is computed by multiplier 401 and shifter 404, and the results are added in adder 403, and then accumulated without further shifting in accumulator 405. On the second of each two alternating cycles, both multiplexers 407 select their respective C-input. BC is then computed by multiplier 402, while right-shifted AC is computed by multiplier 401 and shifter 404, and the results are added in adder 403, and then accumulated, after further shifting by shifter 406, in accumulator 405. The result of the two-cycle operation, where the downstream components—particularly shifter 406—(as well as the input multiplexers 407) operate differently on each cycle, is operation 300.

Figure 5:
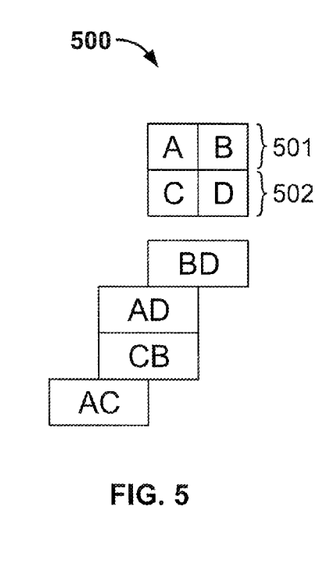
FIG. 5 represents the decomposition of a 54×54 multiplication operation.

FIG. 5 shows the breakdown 500 of a 54×54 fixed-point precision multiplication operation, which may be used to carry out the mantissa portion of a double-precision floating-point multiplication. A first multiplicand 501 may be represented as a 27-bit MSB segment A concatenated with a 27-bit LSB segment B, and a second multiplicand 502 may be represented as a 27-bit MSB segment C concatenated with a 27-bit LSB segment D. FIG. 6 shows a pair of specialized processing blocks 600, 610 that may be double-clocked in accordance with an embodiment of the present invention to implement multiplication operation 500, where each respective block 600, 610 includes two 18×18 multipliers 601, 602 and 611, 612, respectively, so that each block 600, 610 functions as a respective 27×27 multiplier as above (the input multiplexing arrangement discussed above is present, but not shown in FIG. 6 to avoid cluttering the drawing), with the two 27×27 multipliers together functioning as a 54×54 double-precision multiplier.

Figure 6:
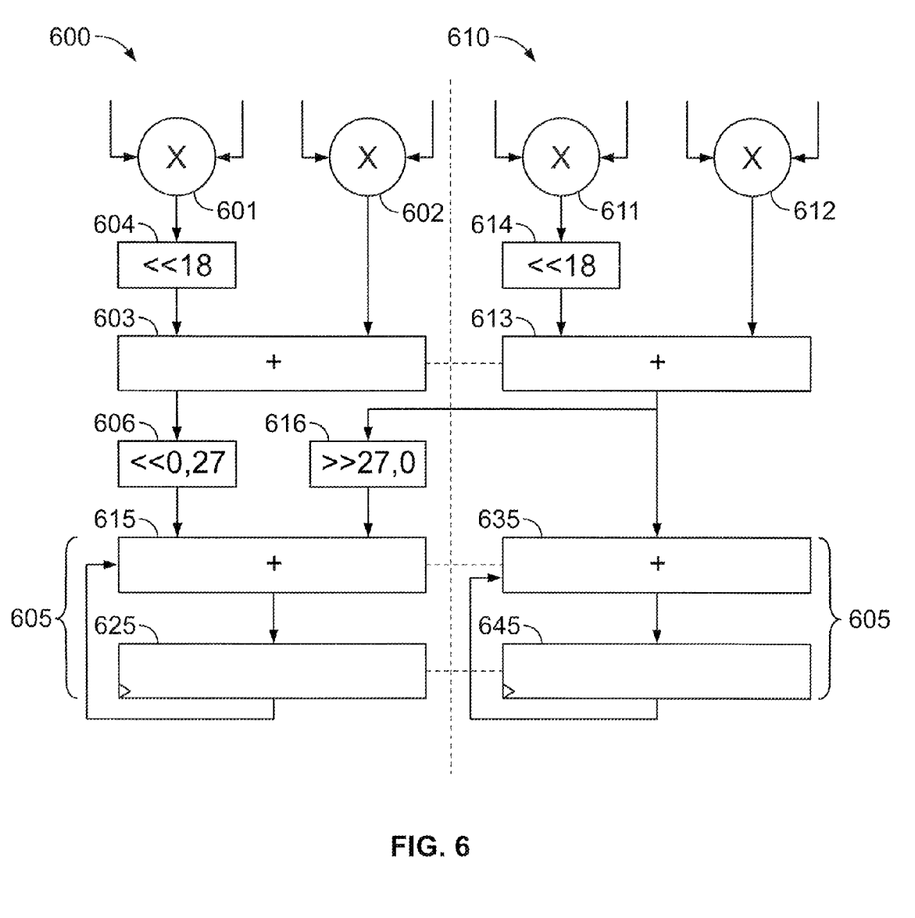
FIG. 6 shows two specialized processing blocks configured according to a second embodiment of the invention to perform the multiplication operation of FIG. 5.

As seen in FIG. 6, each block 600, 610 is similar to block 400, except that block 600 has two shifters 606, 616 between adder 603 and accumulator 605, whose operation will be described below. Specialized processing block 600 includes two 18×18 multipliers 601, 602 whose outputs are input to an adder 603 (which in turn may be made up of compressors and a carry-propagate adder, not shown). An 18-bit left-shifter 604 is located between multiplier 601 and adder 603. Specialized processing block 610 includes two 18×18 multipliers 611, 612 whose outputs are input to an adder 613 (which in turn may be made up of compressors and a carry-propagate adder, not shown). An 18-bit left-shifter 614 is located between multiplier 611 and adder 613. In accumulator stage 605, the two blocks 600, 610 are linked to accommodate the wider output, with accumulator 605 being made up of linked adders 615, 635 and linked registers 625, 645. A left-shifter 606, located between adder 603 and accumulator 605, shifts left 27 bits on the second of each two alternating cycles, but does not operate (or shifts zero bits) on the first of each two alternating cycles. Another left-shifter 616, located between adder 613 and accumulator 605, shifts right 27 bits on the first of each two alternating cycles, but does not operate (or shifts zero bits) on the second of each two alternating cycles.

On the first cycle, the 27-bit values A and D are input to block 600 and the output of adder 603 is the 54-bit product AD. On this cycle, shifter 606 does not operate, so AD is accumulated unshifted in accumulator 605. At the same time, the 27-bit values B and D are input to block 610 and the output of adder 613 is the 54-bit product BD. On this cycle, shifter 616 does operate, so BD is right-shifted 27 bits and that shifted result is accumulated in accumulator 605 along with the unshifted AD value.

On the second cycle, the 27-bit values A and C are input to block 600 and the output of adder 603 is the 54-bit product AC. On this cycle, shifter 606 does operate, so AC is left-shifted 27 bits and that shifted result is accumulated in accumulator 605, along with the two values from the first cycle. At the same time, the 27-bit values B and C are input to block 610 and the output of adder 613 is the 54-bit product BC. On this cycle, shifter 616 does not operate, so BC is accumulated unshifted in accumulator 605, along with the shifted AC value from the current cycle and the two values from the first cycle. The result of the two-cycle operation, where the downstream components—particularly shifters 606, 616—(as well as the input multiplexers, not shown) operate differently on each cycle, is operation 500.

An alternate implementation using the structures of FIG. 6 is based on a recognition that, in FIG. 5, partial products AC and BD are completely offset from one another. Therefore, by computing those two partial products simultaneously, the addition of those two partial products is not an addition at all but merely a concatenation, saving resources.

On the first cycle, the 27-bit values A and C are input to block 600 and the output of adder 603 is the 54-bit product AC. On this cycle, shifter 606 operates to left-shift AC by 27 bits, and then AC is accumulated in accumulator 605. At the same time, the 27-bit values B and D are input to block 610 and the output of adder 613 is the 54-bit product BD. On this cycle, shifter 616 operates as a 27-bit right-shifter, so BD is right-shifted 27 bits and that shifted result is accumulated in accumulator 605 along with the shifted AC value, effectively concatenating those two results.

On the second cycle, the 27-bit values A and D are input to block 600 and the output of adder 603 is the 54-bit product AD. On this cycle, shifter 606 does not operate, so AD is accumulated unshifted in accumulator 605, along with the two values from the first cycle. At the same time, the 27-bit values B and C are input to block 610 and the output of adder 613 is the 54-bit product BC. On this cycle, shifter 616 does not operate, so BC is accumulated in accumulator 605, along with the unshifted AC value from the current cycle and the two values from the first cycle. The result of the two-cycle operation, where the downstream components—particularly shifters 606, 616—(as well as the input multiplexers, not shown) operate differently on each cycle, is operation 500.

For both of the implementations using the embodiment of FIG. 6, the entire BD result may also remain in register 645 of block 610. The lower half of BD forms the least significant portion of the 104-bit result. As it is not added to anything, the lower half of BD can be routed out directly to the destination. As the upper half of BD also exists in 600, where it has been added to the rest of the result partial products in accumulator 605, the upper half in block 610 can be ignored and discarded.

FIG. 7 shows a pair of specialized processing blocks 700, 710 that may be double-clocked in accordance with an alternate embodiment of the present invention to implement multiplication operation 500, where each respective block 700, 710 includes two 18×18 multipliers 701, 702 and 711, 712, respectively, so that each block 700, 710 functions as a respective 27×27 multiplier as above (the input multiplexing arrangement discussed above is present, but not shown in FIG. 7 to avoid cluttering the drawing), with the two 27×27 multipliers together functioning as a 54×54 double-precision multiplier.

Figure 7:
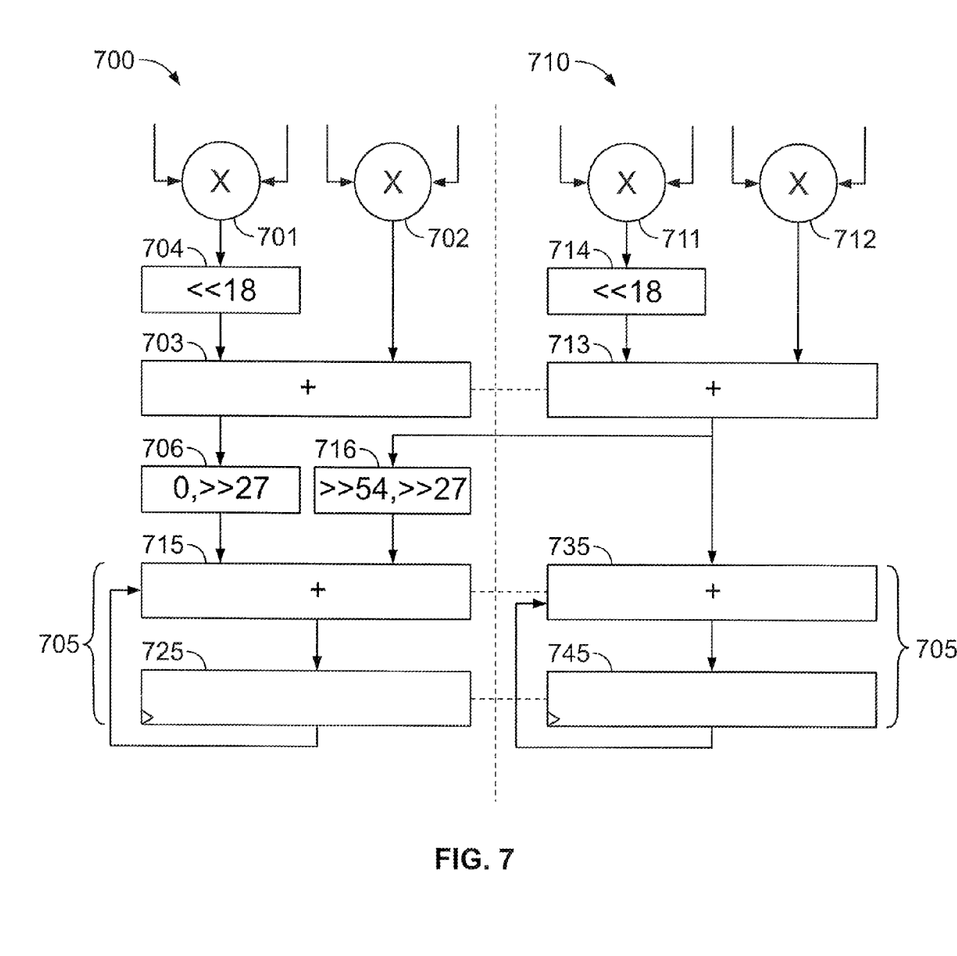
FIG. 7 shows two specialized processing blocks configured according to a third embodiment of the invention to perform the multiplication operation of FIG. 5.

As in the case of the second implementation using the embodiment of FIG. 6, the embodiment of FIG. 7 is based on a recognition that, in FIG. 5, partial products AC and BD are completely offset from one another. Therefore, by computing those two partial products simultaneously, the addition of those two partial products is not an addition at all but merely a concatenation, saving resources.

As seen in FIG. 7, blocks 700, 710 are similar to blocks 600, 610, except that block 700 has two shifters 706, 716 between adder 703 and accumulator 705, which operate differently from shifters 606, 616 as will be described below. Specialized processing block 700 includes two 18×18 multipliers 701, 702 whose outputs are input to an adder 703 (which in turn may be made up of compressors and a carry-propagate adder, not shown). An 18-bit left-shifter 704 is located between multiplier 701 and adder 703. Specialized processing block 710 includes two 18×18 multipliers 711, 712 whose outputs are input to an adder 713 (which in turn may be made up of compressors and a carry-propagate adder, not shown). An 18-bit left-shifter 714 is located between multiplier 711 and adder 713.

In accumulator stage 705, the two blocks 700, 710 are linked to accommodate the wider output, with accumulator 705 being made up of linked adders 715, 735 and linked registers 725, 745. A right-shifter 706, located between adder 703 and accumulator 705, shifts right 27 bits on the second of each two alternating cycles, but does not operate (or shifts zero bits) on the first of each two alternating cycles. Another right-shifter 716, located between adder 713 and accumulator 705, shifts right 54 bits on the first of each two alternating cycles, and shifts right 27 bits on the second of each two alternating cycles. The adders 703, 713 also are linked. Moreover, it will be understood that while data is shown flowing only from block 710 to block 700, the links between the two blocks 700, 710 are bidirectional.

On the first cycle, the 27-bit values A and C are input to block 700 and the output of adder 703 is the 54-bit product AC. On this cycle, shifter 706 does not operate, so AC is accumulated unshifted in accumulator 705. At the same time, the 27-bit values B and D are input to block 710 and the output of adder 713 is the 54-bit product BD. On this cycle, shifter 716 operates as a 54-bit right-shifter, so BD is right-shifted 54 bits and that shifted result is accumulated in accumulator 705 along with the unshifted AC value, effectively concatenating those two results.

On the second cycle, the 27-bit values A and D are input to block 700 and the output of adder 703 is the 54-bit product AD. On this cycle, shifter 706 does operate, so AD is right-shifted 27 bits and that shifted result is accumulated in accumulator 705, along with the two values from the first cycle. At the same time, the 27-bit values B and C are input to block 710 and the output of adder 713 is the 54-bit product BC. On this cycle, shifter 716 operates as a 27-bit right-shifter, so BC is right-shifted 54 bits and that shifted result is in accumulator 705, along with the shifted AC value from the current cycle and the two values from the first cycle. The result of the two-cycle operation, where the downstream components—particularly shifters 706, 716—(as well as the input multiplexers, not shown) operate differently on each cycle, is operation 500.

The 54-bit right-shift 716 can alternatively be a logical operation rather than a physical operation. The logical operation can be implemented by loading BD directly into the accumulator 705. In this exemplary embodiment, for this to work, accumulator 705 must be only 54 bits wide or, if it is wider, the connection from adder 735 to adder 715 (i.e., where the carry is taken from adder 735 into adder 715) would start from the MSB point of where BD is loaded. Likewise, the right-shift from block 700 to block 710 would have the MSB of the value shifted into block 710 line up with the MSB of BD. Using this variation, a smaller shifter and bus from block 700 to block 710 can be used, while still allowing a large (i.e., greater than 54 bits) accumulator in block 700 and/or 710 for other DSP modes that may be implemented.

In addition, although blocks 600 and 610 are shown as being different in FIG. 6, and blocks 700 and 710 are shown as being different in FIG. 7, blocks 600 and 610 can be physically identical, just as blocks 700 and 710 can be physically identical, with appropriate programmable elements (e.g., multiplexers) to allow both configurations 600 and 610, and both configurations 700 and 710, to be implemented by a user logic design.

The embodiments shown above are merely exemplary. Other configurations of specialized processing blocks in programmable integrated circuit devices such as programmable logic devices, where programming software can be provided to allow users to configure a programmable device to perform multiplication operations, may be used in accordance with the invention to implement operation 500 or similar operations.

The structures described above also may be provided in fixed logic, in which case the sizes of the various computational components may be fixed to a particular application. Alternatively, the fixed logic circuitry could allow for limited parameterization.

Instructions for carrying out a method according to this invention for programming a programmable device to perform multiplication operations may be encoded on a machine-readable medium, to be executed by a suitable computer or similar device to implement the method of the invention for programming or configuring PLDs or other programmable devices to perform addition and subtraction operations as described above. For example, a personal computer may be equipped with an interface to which a PLD can be connected, and the personal computer can be used by a user to program the PLD using a suitable software tool, such as the QUARTUS® II software available from Altera Corporation, of San Jose, Calif.

Figure 8:
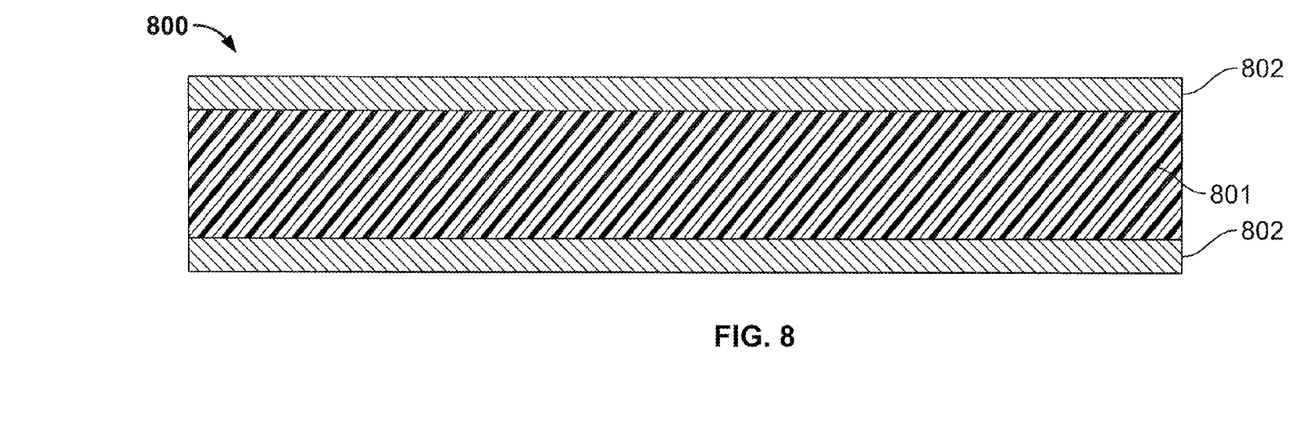
FIG. 8 is a cross-sectional view of a magnetic data storage medium encoded with a set of machine-executable instructions for performing the method according to the present invention.

FIG. 8 presents a cross section of a magnetic data storage medium 800 which can be encoded with a machine executable program that can be carried out by systems such as the aforementioned personal computer, or other computer or similar device. Medium 800 can be a floppy diskette or hard disk, or magnetic tape, having a suitable substrate 801, which may be conventional, and a suitable coating 802, which may be conventional, on one or both sides, containing magnetic domains (not visible) whose polarity or orientation can be altered magnetically. Except in the case where it is magnetic tape, medium 800 may also have an opening (not shown) for receiving the spindle of a disk drive or other data storage device.

The magnetic domains of coating 802 of medium 800 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 9:
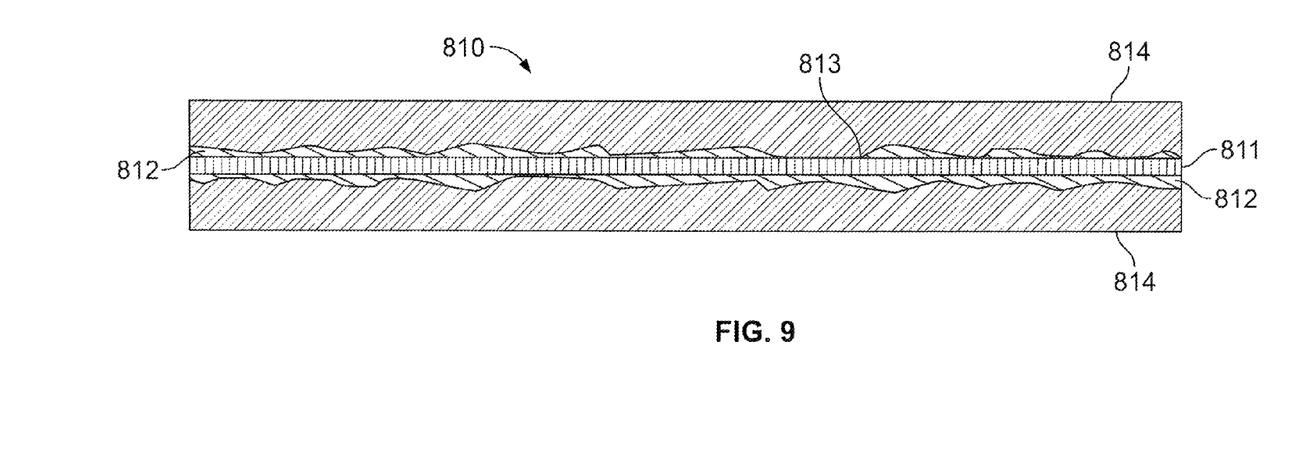
FIG. 9 is a cross-sectional view of an optically readable data storage medium encoded with a set of machine executable instructions for performing the method according to the present invention.

FIG. 9 shows a cross section of an optically-readable data storage medium 810 which also can be encoded with such a machine-executable program, which can be carried out by systems such as the aforementioned personal computer, or other computer or similar device. Medium 810 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 810 preferably has a suitable substrate 811, which may be conventional, and a suitable coating 812, which may be conventional, usually on one or both sides of substrate 811.

In the case of a CD-based or DVD-based medium, as is well known, coating 812 is reflective and is impressed with a plurality of pits 813, arranged on one or more layers, to encode the machine-executable program. The arrangement of pits is read by reflecting laser light off the surface of coating 812. A protective coating 814, which preferably is substantially transparent, is provided on top of coating 812.

In the case of magneto-optical disk, as is well known, coating 812 has no pits 813, but has a plurality of magnetic domains whose polarity or orientation can be changed magnetically when heated above a certain temperature, as by a laser (not shown). The orientation of the domains can be read by measuring the polarization of laser light reflected from coating 812. The arrangement of the domains encodes the program as described above.

A PLD 90 programmed according to the present invention may be used in many kinds of electronic devices. One possible use is in a data processing system 900 shown in FIG. 10. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

Figure 10:
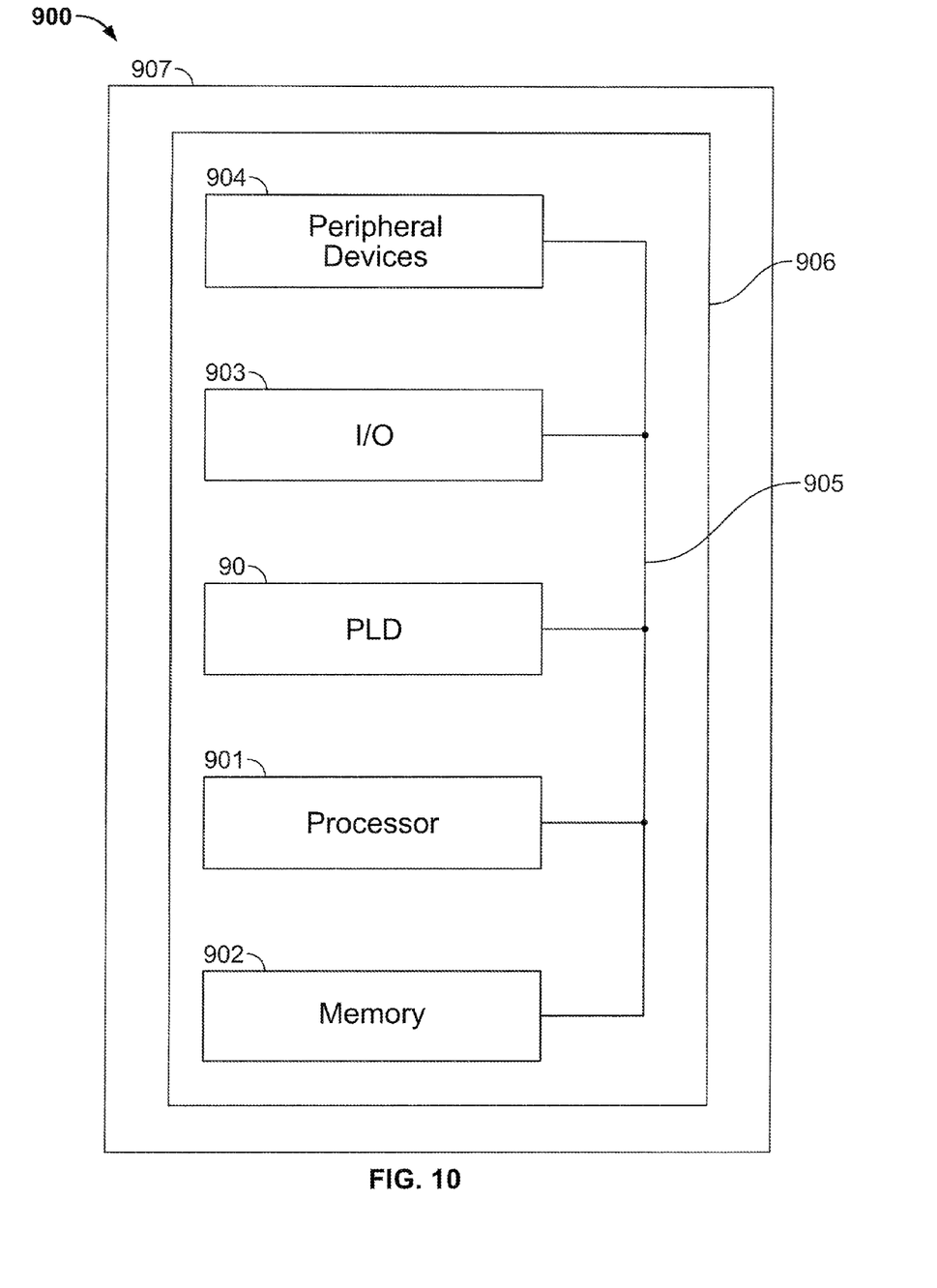
FIG. 10 is a simplified block diagram of an illustrative system employing a programmable logic device incorporating the present invention.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A block of circuitry, within an integrated circuit device clocked by a device clock signal, said block of circuitry being clocked by a block clock signal and comprising:
    block inputs for accepting data, input from outside said block of circuitry, on which arithmetic operations are to be performed;
    arithmetic operations circuitry having arithmetic inputs coupled to said block inputs, for performing said arithmetic operations on said data; and
    logical operations circuitry for operating on outputs of said arithmetic operations circuitry; wherein:
    said arithmetic operations circuitry is configured to operate substantially identically on substantially all clock pulses of said block clock signal; and
    said logic operations circuitry is configured to operate in a first mode on a first set of clock pulses of said block clock signal, and to operate in a second mode on a second set of clock pulses of said block clock signal interleaved with said first set of clock pulses.

2. The block of circuitry of claim 1 wherein said block clock signal is identical to said device clock signal.

3. The block of circuitry of claim 2 wherein said block of circuitry operates on both rising and falling edges of said block clock signal.

4. The block of circuitry of claim 1 wherein said block clock signal is faster than said device clock signal.

5. The block of circuitry of claim 4 wherein said block clock signal is an integer multiple of said device clock signal.

6. The block of circuitry of claim 1 wherein said logic operations circuitry comprises at least one shifter and at least one accumulator.

7. The block of circuitry of claim 6 wherein said at least one shifter comprises a shifter that is operable to shift a first amount in said first mode and a second amount in said second mode.

8. The block of circuitry of claim 7 wherein one of said first amount and said second amount is no shifting.

9. The block of circuitry of claim 7 wherein said first and second amounts are in the same direction but of different magnitudes.

10. The block of circuitry of claim 7 wherein said first and second amounts are in different directions.

11. The block of circuitry of claim 1 further comprising input circuitry configured to operate differently during said second mode than during said first mode.

12. The block of circuitry of claim 11 wherein said input circuitry comprises multiplexers.

13. A programmable integrated circuit device comprising at least one block of circuitry as in claim 1.

14. A method of configuring a programmable integrated circuit device, having at least one specialized processing block, each said specialized processing block being clocked by a respective block clock signal and said integrated circuit device being clocked by a device clock signal, each said specialized processing block having block inputs for accepting data, on which arithmetic operations are to be performed, input from outside said at least one specialized processing block, arithmetic operations circuitry having arithmetic inputs connected to said block inputs for performing said arithmetic operations on said data, and logical operations circuitry for operating on outputs of said arithmetic operations circuitry, said method comprising:
    configuring said arithmetic operations circuitry of at least one of said at least one specialized processing block to operate substantially identically on substantially all clock pulses of said respective block clock signal; and
    configuring said logic operations circuitry of each at least one of said at least one specialized processing block to operate in a first mode on a first set of clock pulses of said respective block clock signal, and to operate in a second mode on a second set of clock pulses of said respective block clock signal interleaved with said first set of clock pulses.

15. The method of claim 14 further comprising configuring each said respective block clock signal to be identical to said device clock signal.

16. The method of claim 15 further comprising configuring said specialized processing block to operate on both rising and falling edges of said block clock signal.

17. The method of claim 14 further comprising configuring each said respective block clock signal to be faster than said device clock signal.

18. The method of claim 17 further comprising configuring each said respective block clock signal to be an integer multiple of said device clock signal.

19. The method of claim 14 further comprising configuring said logic operations circuitry of at least one of said at least one specialized processing block as at least one shifter and at least one accumulator.

20. The method of claim 19 further comprising configuring said at least one shifter to shift a first amount in said first mode and a second amount in said second mode.

21. The method of claim 20 wherein one of said first amount and said second amount is no shifting.

22. The method of claim 20 wherein said first and second amounts are in the same direction but of different magnitudes.

23. The method of claim 20 wherein said first and second amounts are in different directions.

24. A non-transitory machine-readable data storage medium encoded with non-transitory machine-executable instructions for configuring a programmable integrated circuit device, having at least one specialized processing block, each of said at least one specialized processing block being clocked by a respective block clock signal and said integrated circuit device being clocked by a device clock signal, each of said at least one specialized processing block having block inputs for accepting data, input from outside said at least one specialized processing block, on which arithmetic operations are to be performed, arithmetic operations circuitry having arithmetic inputs connected to said block inputs for performing arithmetic operations on said data, and logical operations circuitry operating on outputs of said arithmetic operations circuitry, said instructions comprising:
    instructions to configure said arithmetic operations circuitry of at least one of said at least one specialized processing block to operate substantially identically on substantially all clock pulses of said block clock signal; and instructions to configure said logic operations circuitry of at least one of said at least one specialized processing block to operate in a first mode on a first set of clock pulses of said block clock signal, and to operate in a second mode on a second set of clock pulses of said block clock signal interleaved with said first set of clock pulses.

25. The machine-readable data storage medium of claim 24 further comprising instructions to configure said respective block clock signal to be identical to said device clock signal.

26. The machine-readable data storage medium of claim 25 further comprising instructions to configure said block to operate on both rising and falling edges of said block clock signal.

27. The machine-readable data storage medium of claim 24 further comprising instructions to configure said respective block clock signal to be faster than said device clock signal.

28. The machine-readable data storage medium of claim 27 wherein said instructions to configure said respective block clock signal to be faster than said device clock signal comprise instructions to configure said respective block clock signal to be an integer multiple of said device clock signal.

29. The machine-readable data storage medium of claim 24 further comprising instructions to configure said logic operations circuitry of at least one of said at least specialized processing block as at least one shifter and at least one accumulator.

30. The machine-readable data storage medium of claim 29 further comprising instructions to configure said at least one shifter to shift a first amount in said first mode and a second amount in said second mode.

31. The machine-readable data storage medium of claim 30 wherein, in said instructions to configure said at least one shifter, one of said first amount and said second amount is no shifting.

32. The machine-readable data storage medium of claim 30 wherein, in said instructions to configure said at least one shifter, said first and second amounts are in the same direction but of different magnitudes.

33. The machine-readable data storage medium of claim 30 wherein, in said instructions to configure said at least one shifter, said first and second amounts are in different directions.

* * * * *